(12) United States Patent
Smith (10) Patent No.: US 8,317,465 B2
(45) Date of Patent: Nov. 27, 2012

(54) SYSTEMS AND APPARATUS RELATING TO TURBINE ENGINES AND SEALS FOR TURBINE ENGINES

(75) Inventor: Bruce L. Smith, Oviedo, FL (US)

(73) Assignee: General Electric Company, Schenectady, NY (US)

(*) Notice: Subject to any disclaimer, the term of this patent is extended or adjusted under 35 U.S.C. 154(b) by 631 days.

(21) Appl. No.: 12/497,056

(22) Filed: Jul. 2, 2009

(65) Prior Publication Data

US 2011/0002777 A1    Jan. 6, 2011

(51) Int. Cl.
*F01D 11/08* (2006.01)

(52) U.S. Cl. ............... 415/173.6; 415/176; 416/192

(58) Field of Classification Search ............... 415/173.6, 415/175, 176, 914; 416/189, 192; 244/199.1, 244/199.2, 199.4
See application file for complete search history.

(56) References Cited

U.S. PATENT DOCUMENTS

| | | | |
|---|---|---|---|
| 1,482,031 A * | 1/1924 | Parsons et al. | 277/420 |
| 3,314,651 A | 4/1967 | Beale | |
| 3,876,330 A * | 4/1975 | Pearson et al. | 416/92 |
| 4,161,318 A | 7/1979 | Stuart et al. | |
| 4,662,820 A | 5/1987 | Sasada et al. | |
| 5,044,881 A | 9/1991 | Dodd et al. | |
| 5,290,144 A | 3/1994 | Kreitmeier | |
| 5,639,095 A * | 6/1997 | Rhode | 277/303 |
| 6,068,443 A | 5/2000 | Aoki et al. | |
| 6,102,655 A | 8/2000 | Kreitmeier | |
| 7,094,032 B2 * | 8/2006 | Seleski | 416/192 |
| 7,255,531 B2 | 8/2007 | Ingistov | |
| 7,273,353 B2 * | 9/2007 | Dube et al. | 416/192 |
| 7,320,574 B2 | 1/2008 | Greim et al. | |
| 7,762,779 B2 * | 7/2010 | Zemitis et al. | 416/191 |

FOREIGN PATENT DOCUMENTS

GB  2110767 A  6/1983

* cited by examiner

*Primary Examiner* — Christopher Verdier
*Assistant Examiner* — Andrew C Knopp
(74) *Attorney, Agent, or Firm* — Mark E. Henderson; Ernest G. Cusick; Frank A. Landgraff (57) ABSTRACT

A turbine engine that includes a vortex protrusion disposed upon a component that rotates during operation of the turbine engine; wherein the vortex protrusion includes an outer surface that is configured to induce a vortex flow pattern as the component rotates during operation.

10 Claims, 11 Drawing Sheets

SYSTEMS AND APPARATUS RELATING TO TURBINE ENGINES AND SEALS FOR TURBINE ENGINES

BACKGROUND OF THE INVENTION

This present application relates generally to methods, systems, and/or apparatus for improving the efficiency and/or operation of turbine engines, which, as used herein and unless specifically stated otherwise, is meant to include all types of turbine or rotary engines, including gas turbine engines, aircraft engines, steam turbine engines, and others. More specifically, but not by way of limitation, the present application relates to systems and apparatus pertaining to improved seals for turbine engines.

The performance of a turbine engine is largely affected by its ability to eliminate or reduce leakage and/or the usage of cooling air. Leakage generally results from a pressure difference that exists across a leakage gap. Though it is possible to reduce the pressure difference across the leakage gap, this can place an undesirable limitation on the aerodynamic design of working fluid velocity components. The reduction of the gap itself is desirable, but its elimination is usually not practical due to inevitable different thermal characteristics between the rotating and stationary components, and the centrifugal characteristics of the rotating components. With the added considerations of component manufacturing tolerances and variation in operating conditions, which govern thermal and centrifugal characteristics, it is generally the case that a leakage gap forms during certain significant operating conditions.

In the case of gas turbine engines, cooling air is often routed directly from the compressor to turbine components to protect them from the extreme temperatures of the hot-gas path. The cooling air may be used to directly cool parts or, in some cases, may also be used to purge cavities that are open to the working fluid ingestion though the gaps that exist along the hot-gas path. Generally, to purge cavities, an out-flow of cooling air is created (i.e., a flow of cooling air from the cavity into the hot-gas path) and this out-flow substantially prevents the in-flow of working fluid through the gaps. However, like leakage, purge flows adversely affect the performance and efficiency of the turbine engine. Hence, the usage of purge air should be minimized.

As a result, there is a need for improved systems and apparatus that better seal gaps or cavities within the turbine engine. Particularly, there is a need for improved seals that reduce leakage and/or the usage of cooling air.

BRIEF DESCRIPTION OF THE INVENTION

The present application thus describes a turbine engine that includes a vortex protrusion disposed upon a component that rotates during operation of the turbine engine; wherein the vortex protrusion includes an outer surface that is configured to induce a vortex flow pattern as the component rotates during operation.

The present application further describes a turbine engine comprising a vortex protrusion disposed upon a component that rotates during operation of the turbine engine; wherein the vortex protrusion includes an outer surface that is configured to induce a vortex flow pattern as the component rotates during operation; wherein: the turbine engine includes a rotor blade that includes a shank, an airfoil mounted to the shank, a tip shroud supported by an outer radial end of the airfoil, and a seal rail extending approximately radially from the tip shroud; the vortex protrusion is attached to one of the outer radial face of the tip shroud and the radially aligned face of the seal rail; and the vortex protrusion is positioned such that the induced vortex flow pattern deters leakage of working fluid from an upstream side of the seal rail to a downstream side of the seal rail.

The present application further describes a turbine engine comprising a vortex protrusion disposed upon a component that rotates during operation of the turbine engine; wherein the vortex protrusion includes an outer surface that is configured to induce a vortex flow pattern as the component rotates during operation; wherein: the turbine engine includes a rotor blade that includes a dovetail that attaches the rotor blade to a rotor wheel, and, between the airfoil and the dovetail, a shank; the turbine engine includes a stator blade; a trench cavity is defined by an axial gap between the rotor blade and stator blade; the vortex protrusion is attached to the rotor blade and configured and positioned thereupon so that induced vortex flow pattern deters the flow of working fluid into the trench cavity; the vortex protrusion comprises a non-axisymmetrical protrusion; and a contour of the outer surface of the vortex protrusion comprises a substantially smooth curved contour and an approximate partial helicoidal shape.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

In general, a gas or combustion turbine engine may be used to illustrate an exemplary embodiment of the present invention (though similar or other types of uses in other types of combustion turbine engines are possible). A combustion turbine engine includes a compressor, a combustor, and a turbine. The compressor and turbine generally include rows of blades that are axially stacked in stages. Each stage includes a row of circumferentially-spaced stator blades, which are fixed, and a row of rotor blades, which rotate about a central axis or shaft. In operation, the compressor rotor blades rotate about the shaft, and, acting in concert with the stator blades, compress a flow of air. The supply of compressed air then is used in the combustor to combust a supply of fuel. Then, the resulting flow of hot expanding gases from the combustion, i.e., the working fluid, is expanded through the turbine section of the engine. The flow of working fluid through the turbine induces the rotor blades to rotate. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated.

The performance of a turbine engine is significantly affected by its ability to reduce or eliminate leakage and/or the usage of cooling air. Leakage, which reduces the output and efficiency of a turbine engine, generally refers to the working fluid bypassing the airfoils of the turbine rotor blades such that work is not extracted from it. One manner in which leakage occurs is the flow of working fluid over the outer radial tip of the rotor blades. To prevent this, turbine rotor blades are frequently provided with tip shrouds and a seal rail that projects generally radially outward from the outer surface of the tip shroud. The seal rail generally extends circumferentially between opposite ends of the tip shroud in the general direction of rotation of the turbine rotor.

While seal rails deter some leakage, leakage over the outer radial tips of the rotor blades remains a significant issue. Per some conventional designs, seal rails extend radially into a groove formed in a stationary turbine casing. To prevent rubbing during operation, a clearance between the radial tip of the seal rail and the stationary turbine casing must be maintained. This clearance or gap allows leakage to occur. In other conventional designs, the seal rails extend into a stationary honeycomb shroud that opposes the rotating tip shroud. Typically, for a variety of reasons, a cutter tooth is disposed at the leading edge (also referred to as the suction side) of the seal rail so as to cut a groove in the honeycomb pathway of the stationary shroud that is wider than the width of the seal rail. This slightly wider path provides a clearance or gap that enables leakage flow between the high and low pressure regions on opposite sides of the seal rail. As one of ordinary skill in the art will appreciate, leakage of this nature negatively affects the performance and efficiency of the turbine engine. Thus, there is a need for improved methods, systems and/or apparatus that better seal these types of gaps or cavities such that leakage may be reduced or minimized.

In addition, as stated, cooling air is often routed from the compressor to parts of the turbine to protect certain components from the extreme temperatures of the hot-gas path. The cooling air may be used to directly cool the components or may be used to purge cavities such that working fluid is not ingested into the purge cavities. For example, one area that is sensitive to extreme temperatures of the working fluid is the space that is generally radially inward of the hot-gas path. This area, which is often referred to as the inner wheelspace or wheelspace of the turbine, contains the several turbine wheels or rotors onto which the rotating rotor blades attach. While the rotor blades are designed to withstand the extreme temperatures of the hot-gas path, the rotors generally are not and, thus, it is necessary that the working fluid of the hot-gas path be prevented from flowing into the wheelspace.

However, axial gaps necessarily exist between the rotating blades and the surrounding stationary parts, and it is through these gaps that working fluid may gain access to the wheelspace. In addition, because of the way the engine warms up and differing thermal expansion coefficients between the rotating and stationary components, these gaps may widen and shrink depending on the way the engine is being operated. This variability in size makes it difficult to adequately seal these gaps, which, generally, means that the turbine wheelspace must be purged to avoid hot gas ingestion.

Purging requires that the pressure within the wheelspace be maintained at a level that is greater than the pressure of the working fluid, thus creating a positive flow of purge air through the axial gaps and into the hot gas path. Typically, this is achieved by bleeding air from the compressor and routing it directly into the wheelspace. When this is done, an out-flow of purge air is created (i.e., a flow of purge air from the wheelspace to the hot-gas path), and this out-flow through the gaps prevents the in-flow of working fluid. Thereby, the components within the wheelspace may be protected from the extreme temperatures of the working fluid.

However, purging the wheelspace comes at a price. As one of ordinary skill in the art will appreciate, because purge air bypasses combustion, its usage adversely affects the performance and efficiency of the turbine engine. That is, increased levels of purge air reduce the output and efficiency of the engine. Hence, the usage of purge air should be minimized whenever possible. As a result, there also is a need for improved methods, systems and/or apparatus that better seal gaps or cavities from working fluid ingestion such that the usage of purge air may be minimized.

As described in detail below, the present application proposes to address the above-described areas of need (i.e., the need for improved sealing to reduce leakage and the usage of cooling air in turbine engines, as well as provide enhanced cooling properties to cooling air and additional advantages) through the usage of aerodynamic blading that generates a vortex sheet. That is, the torque from the rotating components of the turbine engine may be converted into kinetic energy of fluid at or near a leakage or purge gap such that enhanced sealing characteristics may be achieved. More particularly, the energized fluid may be used to reduce or eliminate leakage or the usage of cooling air, depending on the unique requirements of the particular application. This, as described in more detail below, may be achieved through the use of a vortex protrusion according to the present invention.

Two exemplary applications of the present invention are described below. The first involves the usage of a vortex protrusion according to an exemplary embodiment to better seal the gap between the outer radial end of a turbine blade and the stationary shroud such that, along with other benefits, leakage is reduced. The second exemplary application involves the usage of a vortex protrusion according to an alternative exemplary embodiment to better seal a gap in the hot-gas path such that, along with other benefits, the usage of cooling air in a purge cavity may be reduced.

Figure 1:
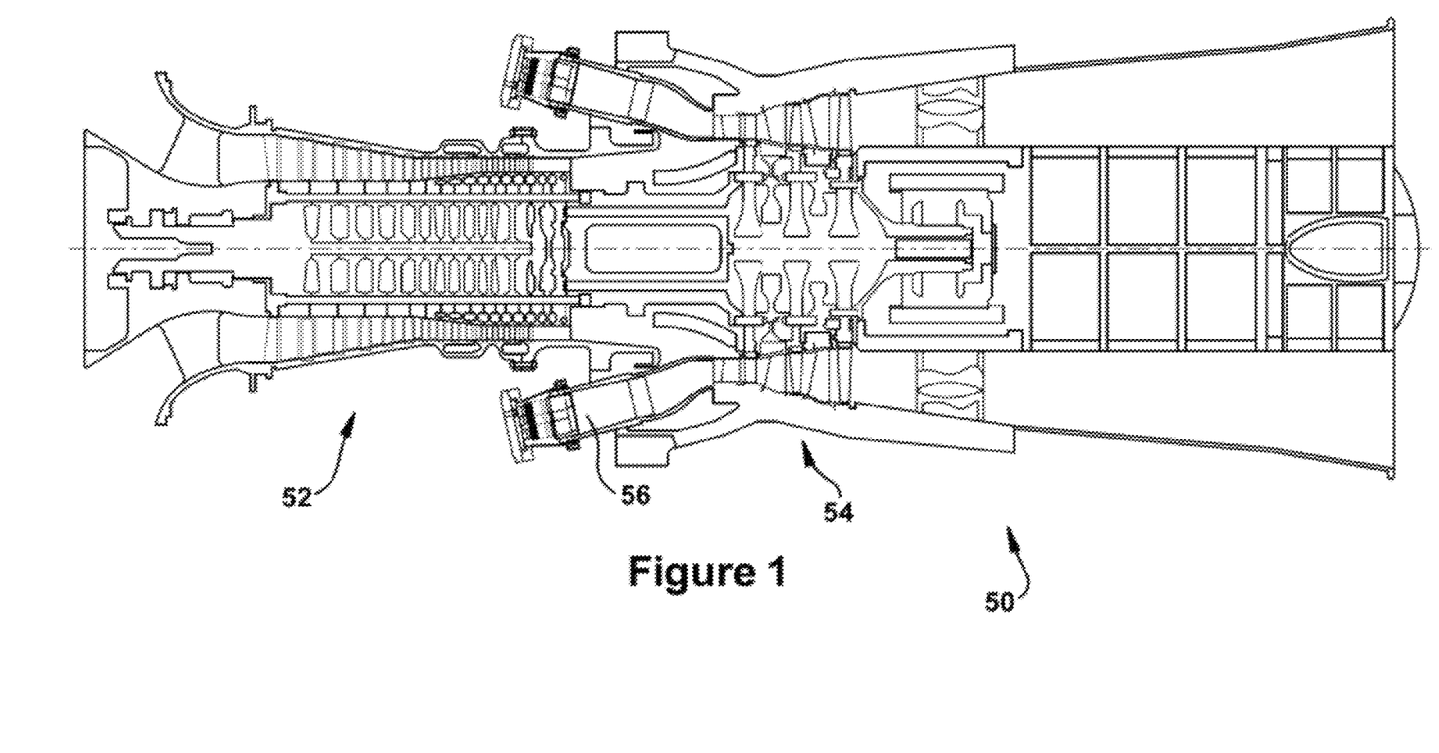
FIG. 1 is a schematic representation of an exemplary gas turbine engine in which embodiments of the present application may be used.
Figure 2:
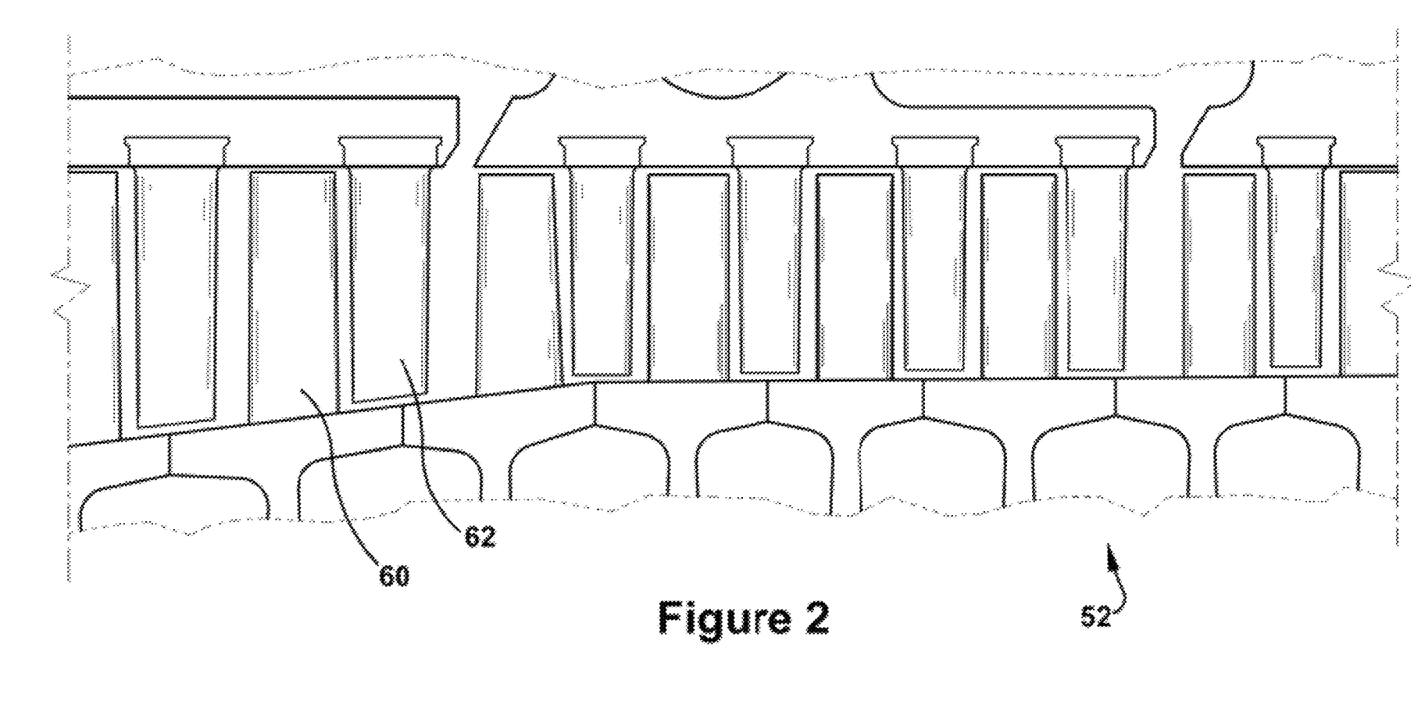
FIG. 2 is a sectional view of the compressor in the gas turbine engine of FIG. 1.
Figure 3:
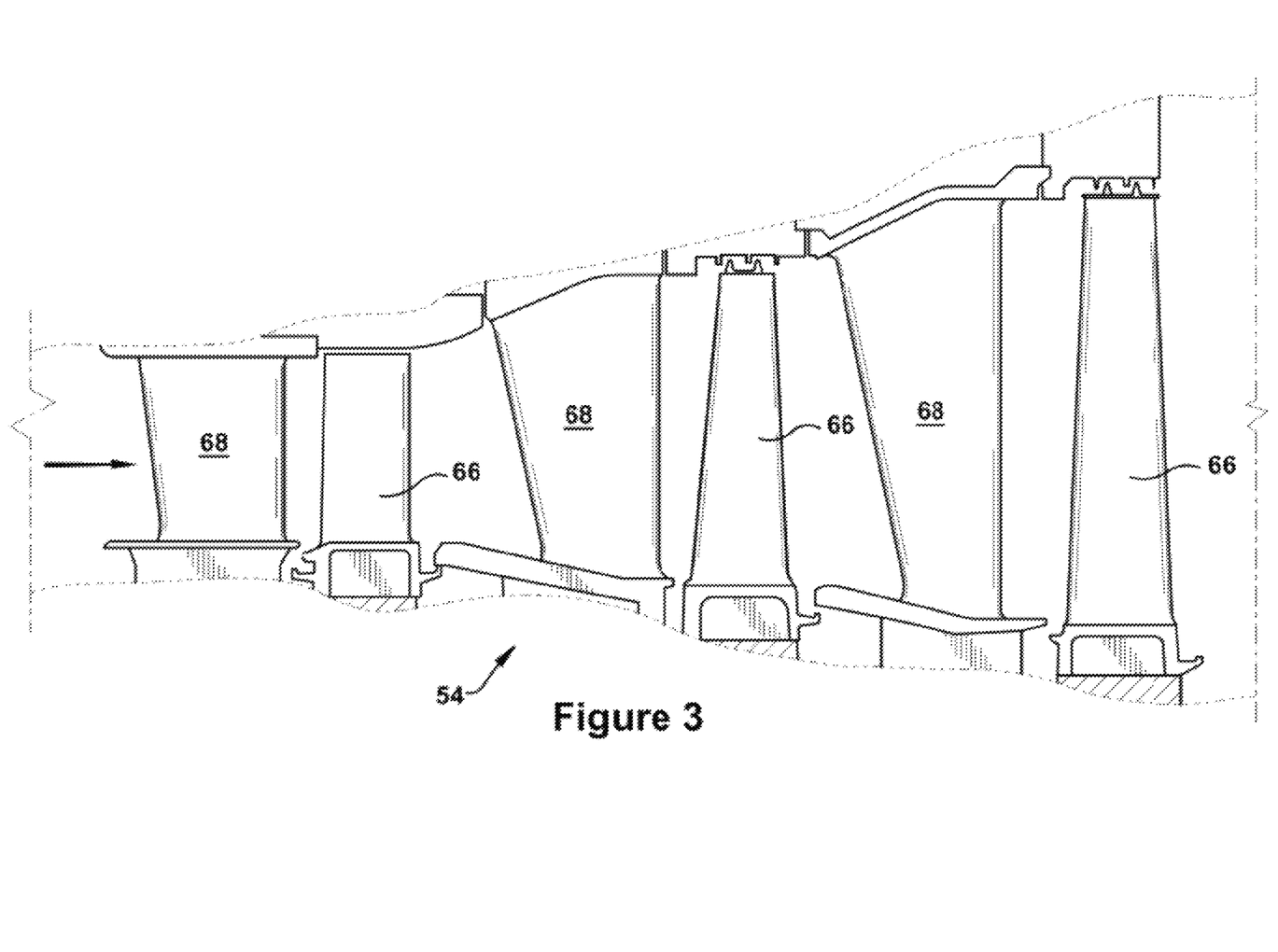
FIG. 3 is a sectional view of the turbine in the gas turbine engine of FIG. 1.

By way of background, referring now to the figures, FIGS. 1 through 3 illustrate an exemplary gas turbine engine in which embodiments of the present application may be used. It will be understood by those skill in the art that the present invention is not limited to this type of usage. As stated, the present invention may be used in gas turbine engines, such as the engines used in power generation and airplanes, steam turbine engines, and other type of rotary engines. FIG. 1 is a schematic representation of a gas turbine engine 50. In general, gas turbine engines operate by extracting energy from a pressurized flow of hot gas that is produced by the combustion of a fuel in a stream of compressed air. As illustrated in FIG. 1, gas turbine engine 50 may be configured with an axial compressor 52 that is mechanically coupled by a common shaft or rotor to a downstream turbine section or turbine 54, and a combustor 56 positioned between the compressor 52 and the turbine 54.

FIG. 2 illustrates a view of an exemplary multi-staged axial compressor 52 that may be used in the gas turbine engine of FIG. 1. As shown, the compressor 52 may include a plurality of stages. Each stage may include a row of compressor rotor blades 60 followed by a row of compressor stator blades 62. Thus, a first stage may include a row of compressor rotor blades 60, which rotate about a central shaft, followed by a row of compressor stator blades 62, which remain stationary during operation. The compressor stator blades 62 generally are circumferentially spaced one from the other and fixed about the axis of rotation. The compressor rotor blades 60 are circumferentially spaced and attached to the shaft; when the shaft rotates during operation, the compressor rotor blades 60 rotates about it. As one of ordinary skill in the art will appreciate, the compressor rotor blades 60 are configured such that, when spun about the shaft, they impart kinetic energy to the air or fluid flowing through the compressor 52. The compressor 52 may have other stages beyond the stages that are illustrated in FIG. 2. Additional stages may include a plurality of circumferential spaced compressor rotor blades 60 followed by a plurality of circumferentially spaced compressor stator blades 62.

FIG. 3 illustrates a partial view of an exemplary turbine section or turbine 54 that may be used in the gas turbine engine of FIG. 1. The turbine 54 also may include a plurality of stages. Three exemplary stages are illustrated, but more or less stages may present in the turbine 54. A first stage includes a plurality of turbine buckets or turbine rotor blades 66, which rotate about the shaft during operation, and a plurality of nozzles or turbine stator blades 68, which remain stationary during operation. The turbine stator blades 68 generally are circumferentially spaced one from the other and fixed about the axis of rotation. The turbine rotor blades 66 may be mounted on a turbine wheel (not shown) for rotation about the shaft (not shown). A second stage of the turbine 54 also is illustrated. The second stage similarly includes a plurality of circumferentially spaced turbine stator blades 68 followed by a plurality of circumferentially spaced turbine rotor blades 66, which are also mounted on a turbine wheel for rotation. A third stage also is illustrated, and similarly includes a plurality of turbine stator blades 68 and rotor blades 66. It will be appreciated that the turbine stator blades 68 and turbine rotor blades 66 lie in the hot gas path of the turbine 54. The direction of flow of the hot gases through the hot gas path is indicated by the arrow. As one of ordinary skill in the art will appreciate, the turbine 54 may have other stages beyond the stages that are illustrated in FIG. 3. Each additional stage may include a row of turbine stator blades 68 followed by a row of turbine rotor blades 66.

In use, the rotation of compressor rotor blades 60 within the axial compressor 52 may compress a flow of air. In the combustor 56, energy may be released when the compressed air is mixed with a fuel and ignited. The resulting flow of hot gases from the combustor 56, which may be referred to as the working fluid, is then directed over the turbine rotor blades 66, the flow of working fluid inducing the rotation of the turbine rotor blades 66 about the shaft. Thereby, the energy of the flow of working fluid is transformed into the mechanical energy of the rotating blades and, because of the connection between the rotor blades and the shaft, the rotating shaft. The mechanical energy of the shaft may then be used to drive the rotation of the compressor rotor blades 60, such that the necessary supply of compressed air is produced, and also, for example, a generator to produce electricity.

Before proceeding further, note that in order to communicate clearly the invention of the current application, it may be necessary to select terminology that refers to and describes certain machine components or parts of a turbine engine. Whenever possible, common industry terminology will be used and employed in a manner consistent with its accepted meaning. However, it is meant that any such technology be given a broad meaning and not narrowly construed such that the meaning intended herein and the scope of the appended claims is unreasonably restricted. Those of ordinary skill in the art will appreciate that often certain components may be referred to with several different names. In addition, what may be described herein as a single part may include and be referenced in another context as consisting of several component parts, or, what may be described herein as including multiple component parts may be fashioned into and, in some cases, referred to as a single part. As such, in understanding the scope of the invention described herein, attention should not only be paid to the terminology and description provided, but also to the structure, configuration, function, and/or usage of the component as described herein.

In addition, several descriptive terms may be used herein. The meaning for these terms shall include the following definitions. The term "rotor blade", without further specificity, is a reference to the rotating blades of either the compressor 52 or the turbine 54, which include both compressor rotor blades 60 and turbine rotor blades 66. The term "stator blade", without further specificity, is a reference the stationary blades of either the compressor 52 or the turbine 54, which include both compressor stator blades 62 and turbine stator blades 68. The term "blades" will be used herein to refer to either type of blade. Thus, without further specificity, the term "blades" is inclusive to all type of turbine engine blades, including compressor rotor blades 60, compressor stator blades 62, turbine rotor blades 66, and turbine stator blades 68. Further, as used herein, "downstream" and "upstream" are terms that indicate a direction relative to the flow of working fluid through the turbine. As such, the term "downstream" means the direction of the flow, and the term "upstream" means in the opposite direction of the flow through the turbine. Related to these terms, the terms "aft" and/or "trailing edge" refer to the downstream direction, the downstream end and/or in the direction of the downstream end of the component being described. And, the terms "forward" and/or "leading edge" refer to the upstream direction, the upstream end and/or in the direction of the upstream end of the component being described. The term "radial" refers to movement or position perpendicular to an axis. It is often required to described parts that are at differing radial positions with regard to an axis. In this case, if a first component resides closer to the axis than a second component, it may be stated herein that the first component is "inboard" or "radially inward" of the second component. If, on the other hand, the first component resides further from the axis than the second component, it may be stated herein that the first component is "ooutboard" or "radially outward" of the second component. The term "axial" refers to movement or position parallel to an axis. And, the term "circumferential" refers to movement or position around an axis.

Figure 4:
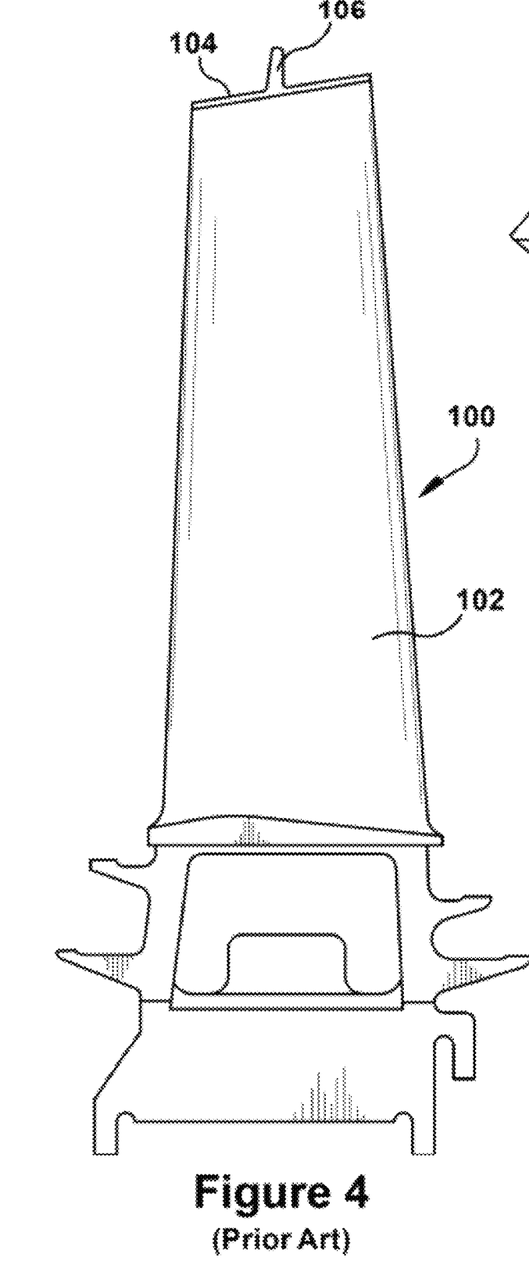
FIG. 4 is a side view of a turbine rotor blade according to conventional design.
Figure 5:
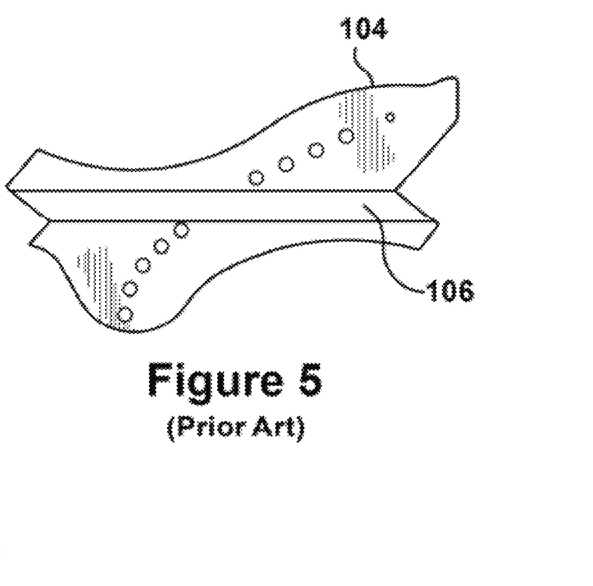
FIG. 5 is a top view of a turbine rotor blade of FIG. 4.

Referring now to FIGS. 4 through 9, the first exemplary application of a vortex protrusion according to an embodiment of the present invention is discussed. FIGS. 4 and 5 illustrate a typical tip shrouded turbine rotor blade 100. The turbine rotor blade 100 includes an airfoil 102, which, as described, is the active component that intercepts the flow of the working fluid. As shown, a tip shroud 104 may be positioned at the top of the airfoil 102. The tip shroud 104 essentially is a flat plate supported towards its center by the airfoil 102. Positioned along the top of the tip shroud 104 may be a seal rail 106. The seal rail 106, as described above, is formed to deter the flow of working fluid through the gap between the tip shroud 104 and the inner surface of the surrounding components (which, as discussed, in some applications, may include a stationary honeycomb or abradable shroud). However, as already described, certain practicalities prevent the seal rail 106 from being an effective seal against leakage.

Figure 6:
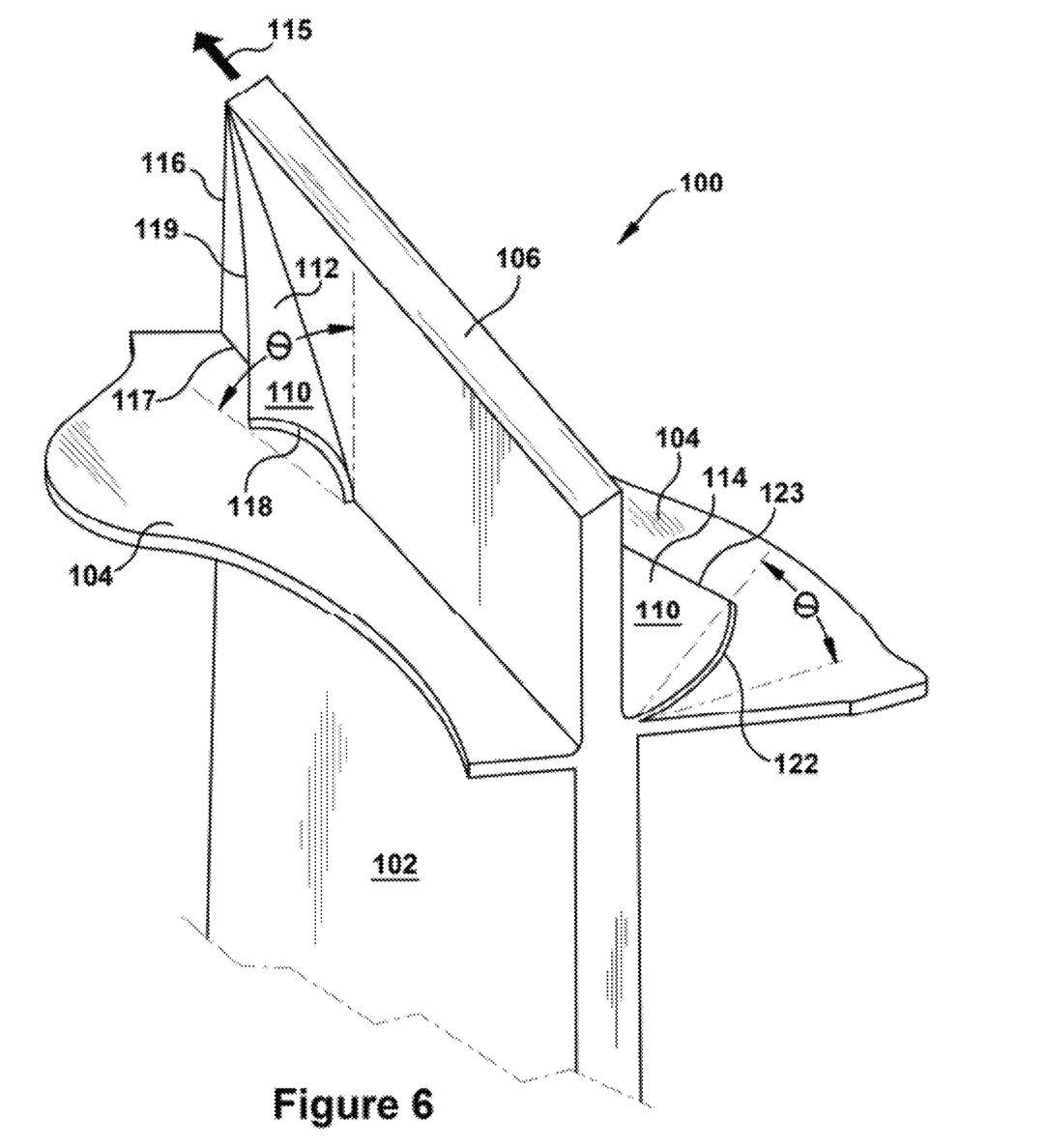
FIG. 6 is a perspective view of a tip shrouded turbine rotor blade with vortex protrusions according to an exemplary embodiment of the present invention.
Figure 7:
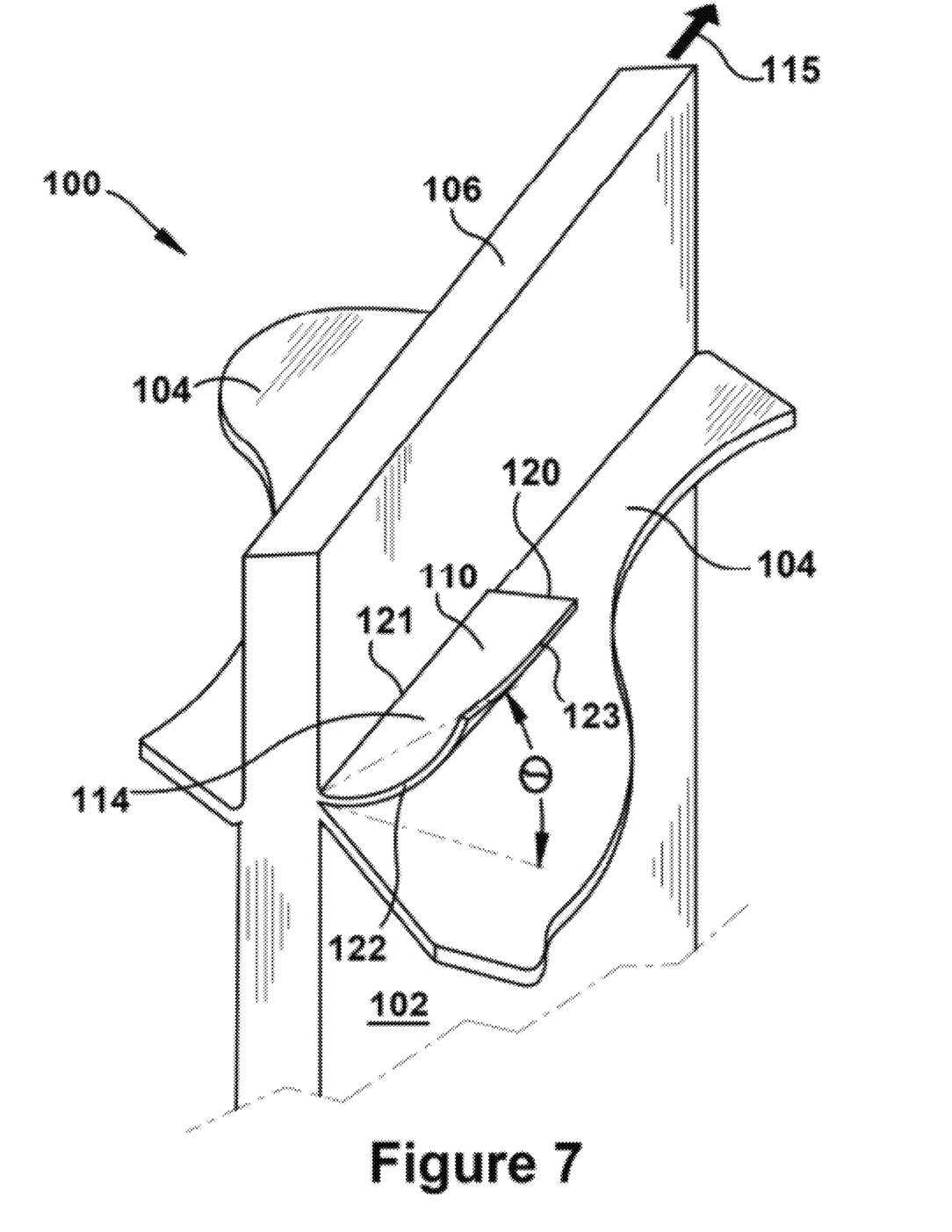
FIG. 7 is alternative perspective view of the tip shrouded turbine rotor blade of FIG. 6.
Figure 8:
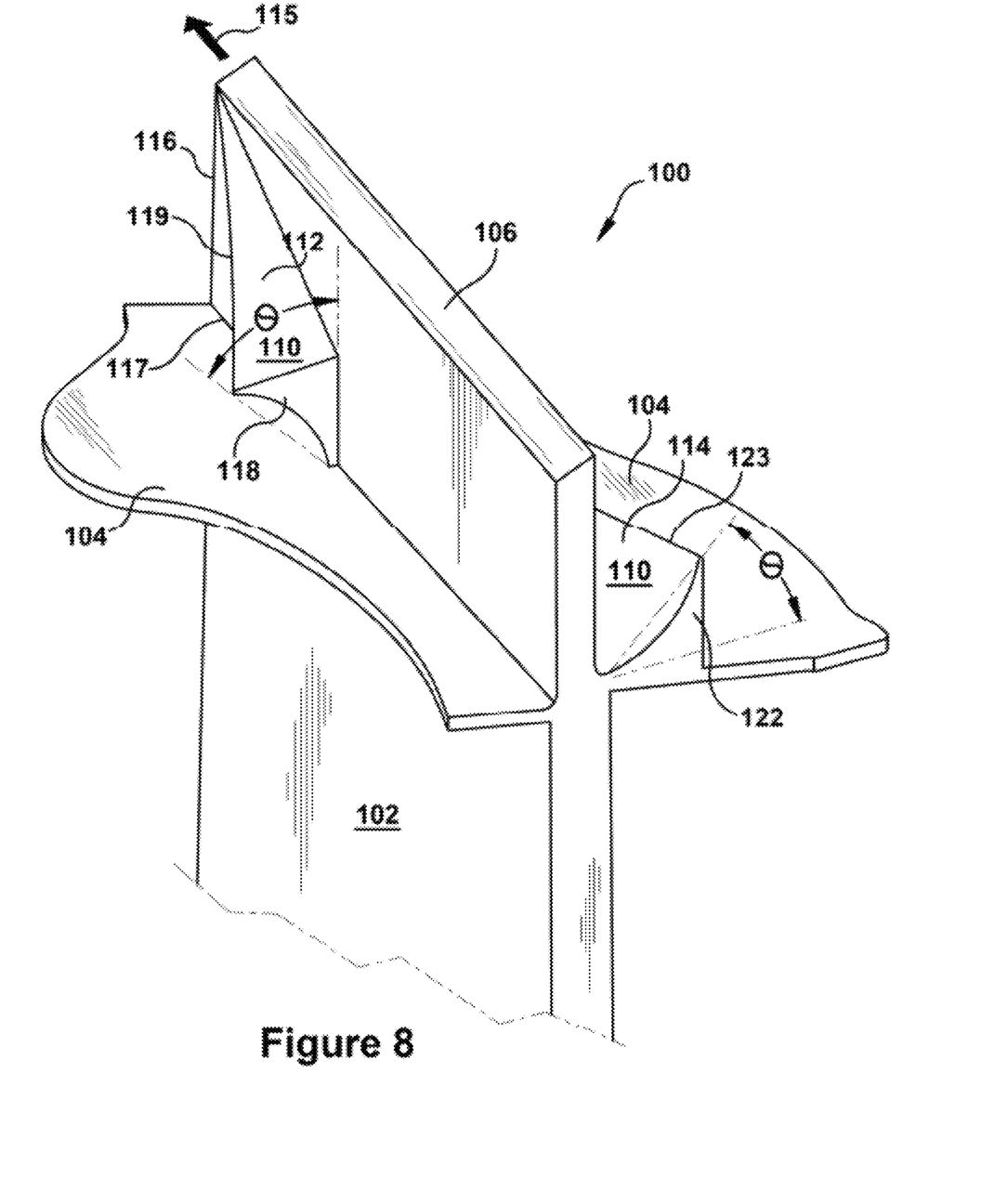
FIG. 8 is a perspective view of a tip shrouded turbine rotor blade with vortex protrusions according to an alternative embodiment of the present invention.

FIGS. 6 through 8 illustrate a tip shrouded turbine rotor blade with vortex protrusions 110 according to exemplary embodiments of the present invention. As shown, a vortex protrusion 110 may be attached to the approximately radially aligned face of the seal rail 106, which will be referred to herein as the side of the seal rail. The vortex protrusion 110, as illustrated, may be attached to both sides of the seal rail 106, i.e., the upstream and downstream side, though in other embodiments, the vortex protrusion 110 may be used on only one side of the seal rail 106. In general, as shown, the vortex protrusion 110 is a non-axisymmetrical protrusion that is configured to induce a vortex flow pattern on each side of the seal rail 106 during operation. As discussed in more detail below, the vortex flow may be used to oppose, prevent or deter leakage flow over the seal rail 106 such that the efficiency of the turbine engine is improved.

The vortex protrusion 110 may take many forms and shapes, and the examples provided herein are not intended to be limiting. Generally, the vortex protrusion 110 includes an axial protrusion that also extends circumferentially and radially. In some embodiments, as shown in FIGS. 6 and 7, the vortex protrusion 110 may comprise a thin fin that twists or curves along one axis. As described in more detail below, this forms an outer surface that has an approximate partial helicoidal shape. Further, the vortex protrusion 110 may be positioned such that, when in motion or presented with a flow of air, this outer surface interacts with the surrounding working fluid and induces a vortex flow pattern therein. Note, in alternative embodiments, not shown, the outer surface of the vortex protrusion 110 may be composed of linear segments, instead of having a smooth curved contour, that produce similar vortex flow patterns as the curved example of FIGS. 6 and 7.

FIGS. 6 and 7 illustrate two different views of vortex protrusions 110 as they may be positioned on an exemplary tip shrouded turbine blade. The vortex protrusions 110 may be referred to as an upstream vortex protrusion 112 and a downstream vortex protrusion 114. As shown, each of these vortex protrusions 112, 114 has an approximate rectangular shape that is twisted along one axis. This axis of twist, as depicted, may be the circumferentially aligned axis. The degree of the twist may vary depending on the application. As used herein, the degree of twist may be described by the angle offset between the opposing edges of the vortex protrusion that are approximately perpendicular to the axis along which the vortex protrusion 110 is twisted. In cases where one or both of the opposing edges are curved, a reference line connecting the two corners of the edge may be used to determine the angle. As shown in FIGS. 6 and 7, this reference line may be compared with a reference line representing the opposing edge to form an angle θ, which is defined herein to be the degree of twist for the vortex protrusion 110. In some embodiments, the vortex protrusion 110 will have a degree of twist such that the formed angle θ is between approximately 10 and 80 degrees. More preferably, in other embodiments, the vortex protrusion 110 will have a degree of twist such that the formed angle θ is between approximately 30 and 60 degrees. Still, more preferably, in other embodiments, the vortex protrusion 110 will have a degree of twist such that the formed angle θ is approximately 45 degrees.

The upstream vortex protrusion 112 and the downstream vortex protrusion 114 are similar in shape and form, as shown, but each may be attached and oriented in a different manner to produce desired results. Each is generally rectangular in shape, and includes four sides or edges. The four edges may be described given their orientation to and placement on the rotor blade and the direction of rotation of the rotor blade in operation. (Note that the direction of rotation for the rotor blade in FIGS. 6 and 7 is shown by arrow 115.) The upstream vortex protrusion 112 thus may include: an edge facing the direction of rotation or forward edge 116; an inboard edge 117; a rearward edge 118; and an outboard edge 119. The upstream vortex protrusion 112, as shown, may be attached to the seal rail 106 along two of its edges. These two edges, as shown, may be the forward edge 116 and the inboard edge 117. The twisted shape of the vortex protrusion 110 may be formed, as shown, by configuring the corner diagonally opposite the corner formed by the two attached edges, which is the corner formed between the outboard edge 119 and the rearward edge 118, such that this corner resides away from the side of the seal rail 106. More particularly, the forward edge 116 may be approximately linear and parallel with the side of the seal rail 106, while the rearward edge 118 may be curved by bending the corner formed between the outboard edge 119 and the rearward edge 118 away from the side of the seal rail 106, as shown. This type of configuration results in a forward edge 116 that is parallel to the radially aligned seal rail 106 and a rearward edge 118 that, in relation to the foreword edge 116, is twisted in an approximate counterclockwise direction (when viewed from a position aft of the trailing edge of the tip shroud 104).

The downstream vortex protrusion 114, as shown, may be described as including: an edge facing the direction of rotation or forward edge 120; an inner edge 121; a rearward edge 122; and an outer edge 123. The downstream vortex protrusion 114, as shown, may be attached to the seal rail 106 along one edge. This edge, as shown, may be the inner edge 121. The twisted shape of the vortex protrusion 110 may be formed, as shown, by configuring the corner formed between the rearward edge 122 and the outer edge 123 such that it resides outboard of the outer radial face of the tip shroud 104. More particularly, the forward edge 120 may be approximately linear and perpendicular to the side of the seal rail 106, while the rearward edge 122 may be curved by displacing the corner formed between the outer edge 123 and the rearward edge 122 in an outward radial direction, as shown. This type of configuration results in a forward edge 120 that is parallel to the outer surface of the tip shroud 104 and a rearward edge 122 that, in relation to the foreword edge 120, is twisted in an approximate counterclockwise direction (when viewed from a position aft of the trailing edge of the tip shroud 104).

In an alternative embodiment, not shown, the downstream vortex protrusion 114 also may make a connection with the outer radial surface of the tip shroud. In this case, the downstream vortex protrusion 114 may still also be connected to the side of the seal rail 106 or may be completely supported by the tip shroud 104. In other embodiments, not shown, the downstream vortex protrusion 114 may be separated from the seal rail 106 and completely supported by the outer radial surface of the tip shroud.

In some alternative embodiments, the vortex protrusion 110 may be, instead of the relatively thin fin, a protrusion with a thicker or solid body. FIG. 8 illustrates an upstream vortex protrusion 112 and a downstream vortex protrusion 114 of this type. As shown, each of these vortex protrusions 110 has an outer face that has a similar curved contour as that shown for the embodiments of FIGS. 6 and 7. As a result, the vortex protrusions 112, 114 of FIG. 8 would operate similarly to the thin fin type shown in FIGS. 6 and 7. The thicker body may be advantageous for some applications in that a larger surface for attachment may be used to strengthen the bond between the vortex protrusion 110 and the tip shroud or other surface. Alternatively, the thicker body may provide the ability to more conveniently manufacture the protrusion as an integral part to the component to which it is connected. It will be appreciated that all other embodiments provided herein as including relatively thin fins may also be provided with the thicker bodies as shown in FIG. 8.

Figure 9:
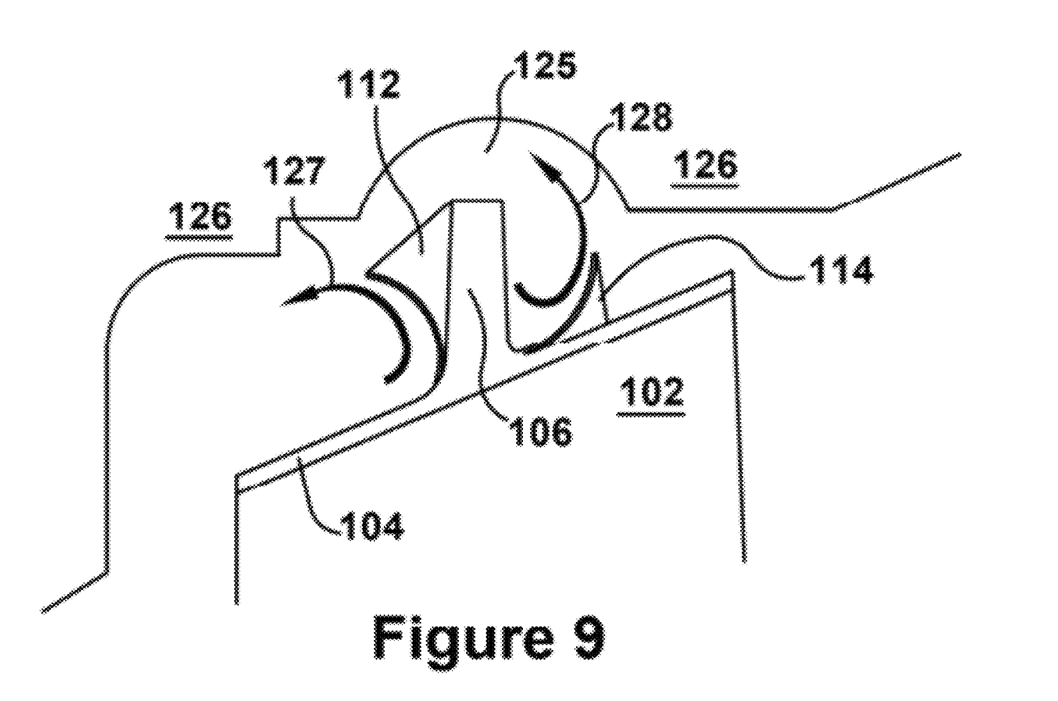
FIG. 9 is a schematic sectional view of a tip shrouded turbine rotor blade with vortex protrusions and the surrounding turbine casing according to an exemplary embodiment of the present application.

FIG. 9 illustrates a schematic representation of an upstream vortex protrusion 112 and a downstream vortex protrusion 114 in use. As is common in conventional design, the seal rail 106 extends radially outward from the tip shroud 104 and partially into a depression or groove 125 formed in the turbine casing 126. (Note, as stated above, in some cases, the seal rail 106 may be used to cut a groove in an abradable honeycomb material. The seal formed in this arrangement, as previously described, also allows leakage. As one of ordinary skill in the art will appreciate, the present invention may also be used with this type of arrangement.) In use, leakage generally flows through the gap that exists between the seal rail 106 and the groove 125. As one of ordinary skill in the art will appreciate, the rotation of the rotor blades and the configuration and placement of the upstream vortex protrusion 112 and the downstream vortex protrusion 114 causes a vortex flow pattern to develop, which is indicated by an arrow 127 and arrow 128, respectively. More particularly, the flow induced by the upstream vortex protrusion 112, as indicated by arrow 127, will generally create a spiraling flow that arcs outward and provides resistance against working fluid that might otherwise flow toward the groove 125 and through the gap. That is, the induced vortex flow pattern 127 curls around such that it generally opposes, at least partially, working fluid that is headed for the gap.

The flow induced by the downstream vortex protrusion 114, as indicated by arrow 128, works similarly, except it opposes flow through the gap from the backside of the gap or from a downstream position. More particularly, the flow induced by the downstream vortex protrusion 114, as indicated by arrow 128, will generally create a spiraling flow that arcs outward and provides resistance against working fluid that might otherwise flow through the gap. That is, the induced vortex flow pattern 128 curls around such that it generally opposes, at least partially, any working fluid that is currently flowing through the gap.

Figure 10:
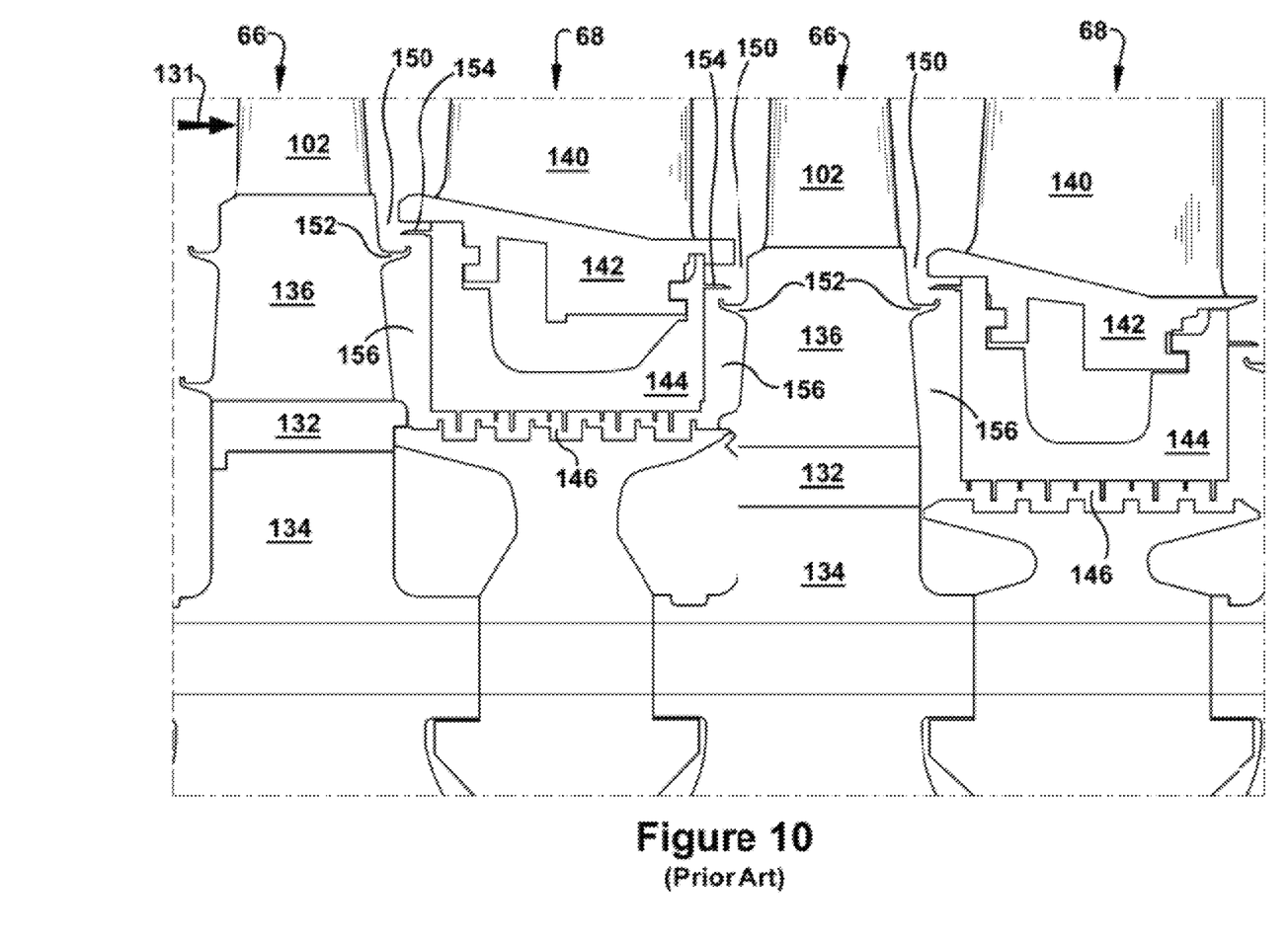
FIG. 10 is a schematic sectional view of the inner radial portion of several rows of rotor and stator blades as configured in an exemplary turbine according to conventional design.

Referring again to the figures, the second exemplary use of a vortex protrusion according to an embodiment of the present application is illustrated. FIG. 10 schematically illustrates a sectional view of the radially inward portion of several rows of blades as they might be configured in an exemplary turbine according to conventional design. As one of ordinary skill in the art will appreciate, the view includes the radial inward features of two rows of rotor blades 66 and two rows of stator blades 68. Each rotor blade 66 generally includes an airfoil 102 that resides in the hot-gas path and interacts with the working fluid of the turbine (the flow direction of which is indicated by arrow 131), a dovetail 132 that attaches the rotor blade 66 to a rotor wheel 134, and, between the airfoil 102 and the dovetail 132, a section that is typically referred to as the shank 136. As used herein, the shank 136 is meant to refer to the section of the rotor blade 66 that resides between the attachment means, which in this case is the dovetail 132, and the airfoil 102. Each stator blade 68 generally includes a stator airfoil or airfoil 140 that resides in the hot-gas path and interacts with the working fluid and, radially inward of the airfoil 140, an inner sidewall 142 and, radially inward of the inner sidewall 142, a diaphragm 144. Typically, the inner sidewall 142 is integral to the airfoil 140 and forms the inner boundary of the hot-gas path. The diaphragm 144 typically attaches to the inner sidewall 142 (though may be formed integral therewith) and extends in an inward radial direction to form a seal 146 with the rotating machinery.

It will be appreciated that axial gaps are present along the radially inward edge of the hot-gas path. Generally, these gaps, which will be referred to herein as "trench cavities 150", are present because of the space that must be maintained between the rotating parts (i.e., the rotor blades 66) and the stationary parts (i.e., the stator blades 68). Because of the way the engine warms up, operates at different load conditions, and the differing thermal expansion coefficients of some of the components, the width of the trench cavity 150 (i.e., the axial distance across the gap) generally varies. That is, the trench cavity 150 may widen and shrink depending on the way the engine is being operated. Because it is highly undesirable for the rotating parts to rub against stationary parts, the engine must be designed such that at least some space is maintained at the trench cavity 150 locations during all operating conditions. This generally results in a trench cavity 150 that has a relatively narrow opening during some operating conditions and a relatively wide opening during other operating conditions. Of course, a trench cavity 150 with a relatively wide opening is undesirable because it generally invites more working fluid ingestion into the turbine wheelspace.

It will be appreciated that a trench cavity 150 generally exists at each point along the radially inward boundary of the hot-gas path where rotating parts border stationary parts. Thus, as illustrated, a trench cavity 150 is formed between the trailing edge of the rotor blade 66 and the leading edge of the stator blade 68 and between the trailing edge of the stator blade 68 and the leading edge of the rotor blade 66. Typically, in regard to the rotor blades 66, the shank 136 defines one edge of the trench cavity 150, and, in regard to the stator blades 68, the inner sidewall 142 defines the other edge of the trench cavity 150. Often, an angel wing projection or angel wing 152 may be formed on the shank 136 of the rotor blades 66. Each angel wing 152 may coincide with a stator projection 154 that is formed on the stator blade 68. The stator projection 154 may be formed on either the inner sidewall 142 or, as shown, on the diaphragm 144. Typically, the angel wing 152 is formed inboard of the stator projection 154, as shown. More than one angel wing 152/stator projection 154 pair may be present. Generally, inboard of the first angel wing 152, the trench cavity 150 is said to transition into a wheelspace cavity 156.

As stated, it is desirable to prevent the working fluid of the hot-gas path from entering the trench cavity 150 and the wheelspace cavity 156 because the extreme temperatures may damage the components within this area. The angel wing 152 and the stator projection 154 are formed to limit ingestion. However, because of the varying width of the trench cavity 150 opening and the relative ineffectiveness of the angel wing 152/stator projection 154, working fluid would be regularly ingested into the wheelspace cavity 156 if the cavity were not purged with a relatively high level of compressed air bled from the compressor. As stated, because purge air negatively affects the performance and efficiency of the engine, its usage should be reduced whenever possible.

Figure 11:
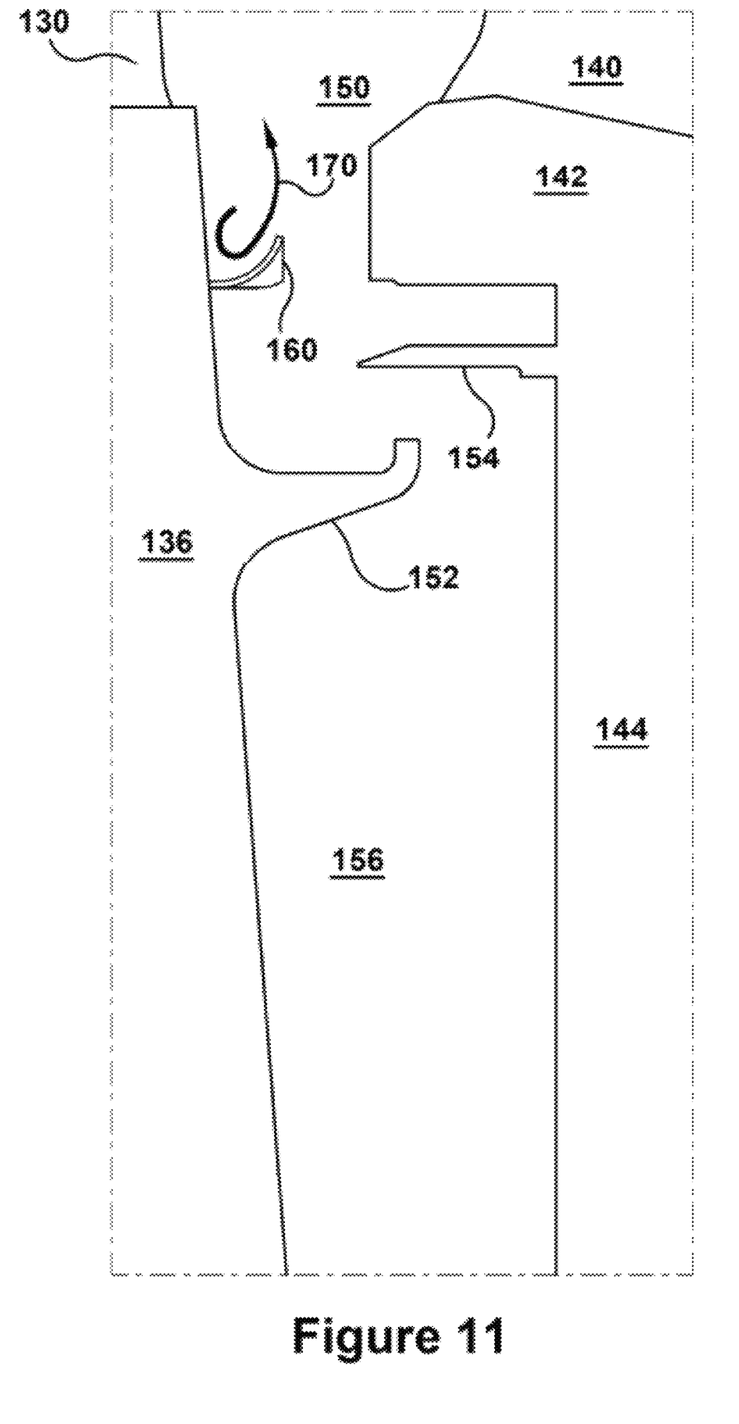
FIG. 11 is a sectional view of a trench cavity and a vortex protrusion according to an exemplary embodiment of the present invention.
Figure 12:
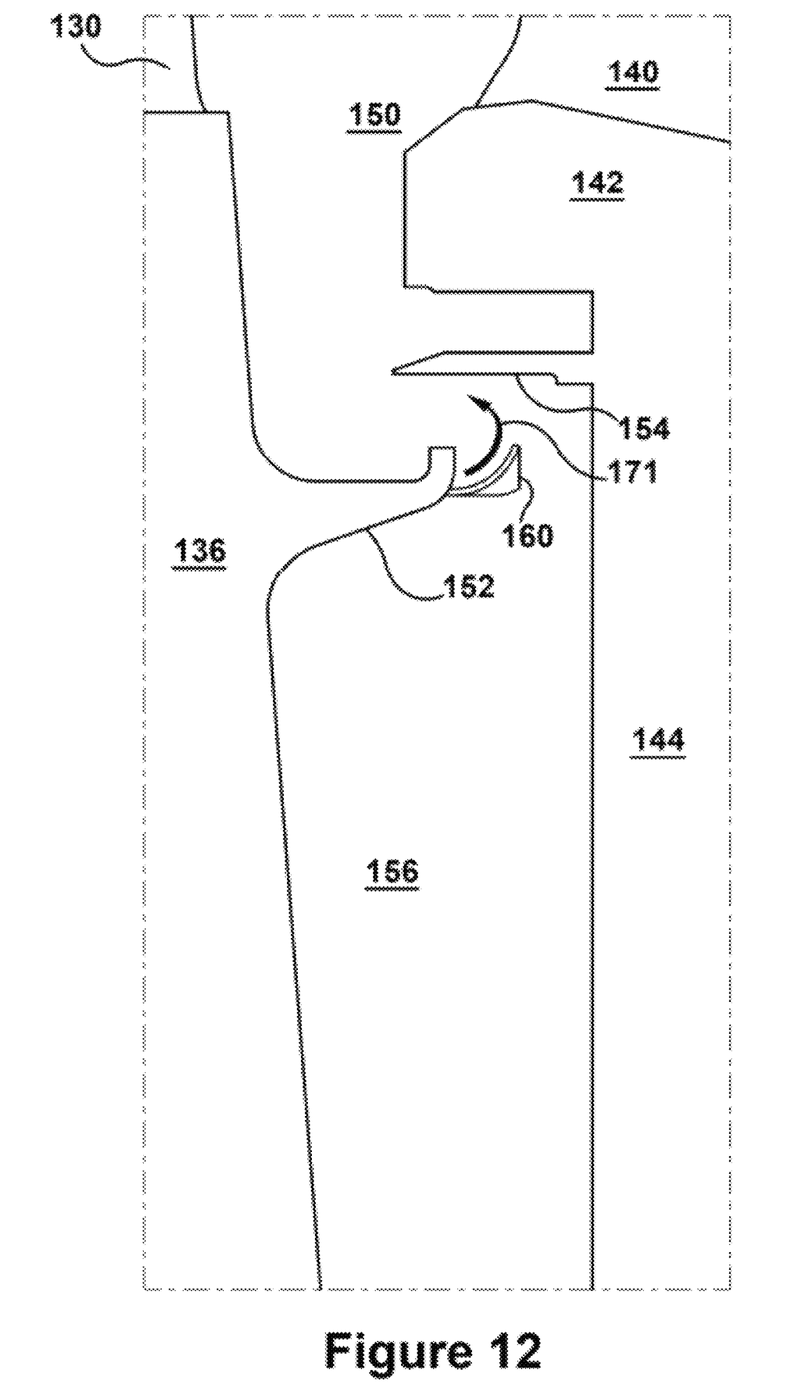
FIG. 12 is a sectional view of a trench cavity and a vortex protrusion according to an alternative embodiment of the present invention.

FIGS. 11 and 12 illustrate vortex protrusions 160 as they may be attached to a turbine rotor blade 66 according to embodiments of the present application. As configured, the vortex protrusions 160 of FIGS. 11 and 12 may be used to curb ingestion into the trench cavity 150 and, thereby, reduce the usage of purge air. In general, the trench cavity vortex protrusion 160 may have any of the characteristics as the exemplary vortex protrusions 112, 114 discussed above, including being configured as a thin fin (as shown in FIGS. 11 and 12) or being configured with a thicker, more substantial body (similar to the embodiment shown in FIG. 8). In some embodiments, as shown, the trench cavity vortex protrusions 160 of FIGS. 11 and 12 may be similar in form, shape, and installed orientation as that discussed above for the downstream vortex protrusion 114.

When used in the trench cavity 150, the vortex protrusion 160 may be attached to the shank 136 of the rotor blade 66. In some preferred embodiments, the trench cavity vortex protrusion 160 may be attached inboard of the opening of the trench cavity 150 but in proximity thereto, as shown in FIG. 11. In an alternative embodiment, the vortex protrusion 110 of the trench cavity may be attached to a position that is inboard of the angel wing 152. In one preferred embodiment, as shown in FIG. 12, the vortex protrusion 160 may be attached to the distal end of the angle wing 152.

The trench cavity vortex protrusion 160 may be attached to the outboard portions of the shank 136 (i.e., outboard of the angel wing 152) (as in FIG. 11) or the angel wing 152 (as in FIG. 12) along one edge, similar to that shown and described in relation to the downstream vortex protrusion of 114 of FIGS. 6, 7 and 8. This one edge may also be referred to as an inner edge. The twisted shape of the trench cavity vortex protrusion 160 may be formed, as shown, by configuring the rearward/outer corner such that it curves in a general outboard direction. More particularly, the forward edge of the trench cavity vortex protrusion 160 may be approximately linear and perpendicular to the side of the shank 136, while the rearward edge may be curved with the rearward/outer corner bending in a general outward radial direction, similar to that described for the downstream vortex protrusion 114. This type of configuration results in a forward edge that is linear and a rearward edge that, in relation to the foreword edge, is twisted in an approximate counterclockwise direction (when viewed from a position aft of the shank 136).

In conventional turbine engines, working fluid may be ingested into wheelspace cavity 156 through the trench cavity 150. As stated, this ingestion may be reduced by the usage of a trench cavity vortex protrusion 160. As one of ordinary skill in the art will appreciate, the rotation of the rotor blades and the configuration and placement of the trench cavity vortex protrusion 160 causes a vortex flow pattern to develop, which is indicated by an arrow 170. More particularly, the flow induced by the trench cavity vortex protrusion 160, as indicated by arrow 170, will generally create a spiraling flow that arcs outward and provides resistance against working fluid that might otherwise flow toward or into the opening of the trench cavity 150. That is, the induced vortex flow pattern 170 curls around such that it generally opposes, at least partially, working fluid that is headed for the opening of the trench cavity 150, or it generally opposes, at least partially, working fluid that is already in the trench cavity 150 from proceeding further.

In regard to the vortex protrusion 160 of FIG. 12, given the narrowness of the trench cavity 150 at that point and the axial passageway formed between the angel wing 152 and the stator projection 154, this location for the vortex protrusion 160 may be particularly effective at preventing ingestion. As indicated by arrow 171, in this position, the vortex protrusion 160 may create a swirl or vortex flow pattern that opposes ingestion and facilitates and assists the outward flow of purge air from the wheelspace cavity to the trench cavity 150 and/or from the trench cavity 150 to the hot gas path. This may allow less purge air use, thereby increasing engine performance.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each possible iteration is not herein discussed in detail, though all combinations and possible embodiments embraced by the several claims below are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. A turbine engine comprising a vortex protrusion disposed upon a component that rotates during operation of the turbine engine; wherein the vortex protrusion includes an outer surface that is configured to induce a vortex flow pattern as the component rotates during operation;

wherein:
the turbine engine includes a rotor blade that includes a shank, an airfoil mounted to the shank, a tip shroud supported by an outer radial end of the airfoil, and a seal rail extending approximately radially from the tip shroud;
the vortex protrusion is attached to one of the outer radial face of the tip shroud and the radially aligned face of the seal rail; and
the vortex protrusion is positioned such that the induced vortex flow pattern deters leakage of working fluid from an upstream side of the seal rail to a downstream side of the seal rail;
the turbine engine comprises at least one of an upstream vortex protrusion and a downstream vortex protrusion;
the upstream vortex protrusion comprises a vortex protrusion that is attached upstream of the seal rail and includes a forward edge, an inboard edge, a rearward edge, and an outboard edge, with the upstream vortex protrusion being attached along at least one of the forward edge and the inboard edge, and with the rearward edge being twisted in relation to the forward edge; and
the downstream vortex protrusion comprises a vortex protrusion that is attached downstream of the seal rail and includes a forward edge, an inner edge, a rearward edge, and an outer edge, with the downstream vortex protrusion being attached along the inner edge, and with the rearward edge being twisted in relation to the forward edge.

2. The turbine engine of claim 1, wherein the vortex protrusion comprises one of a thin fin and a thick solid body.

3. The turbine engine of claim 1, wherein:
the vortex protrusion comprises a non-axisymmetrical protrusion; and
a contour of the outer surface of the vortex protrusion comprises a substantially smooth curved contour and an approximate partial helicoidal shape.

4. The turbine engine of claim 1, wherein:
the vortex protrusion comprises a thin fin that twists along one axis; and
the vortex protrusion is positioned such that the axis of twist is approximately circumferentially aligned.

5. The turbine engine of claim 4, wherein the degree of the twist is within a range of approximately 10-80 degrees.

6. The turbine engine of claim 4, wherein the degree of the twist is within a range of approximately 30-60 degrees.

7. The turbine engine of claim 4, wherein the degree of the twist is within a range of approximately 40-50 degrees.

8. The turbine engine of claim 4, wherein the degree of the twist is approximately 45 degrees.

9. The turbine engine of claim 1, wherein:
the upstream vortex protrusion is configured and positioned such that the induced vortex flow pattern provides resistance against working fluid that might otherwise flow toward a gap between the seal rail and a stationary component; and
the downstream vortex protrusion is configured and positioned such that the induced vortex flow pattern provides resistance against working fluid that might otherwise flow through the gap between the seal rail and the stationary component.

10. The turbine engine of claim 1, wherein the vortex protrusion is positioned such that the induced vortex flow pattern deters leakage of working fluid through a gap.

* * * * *